US010789664B2

(12) United States Patent
Jinno et al.

(10) Patent No.: US 10,789,664 B2
(45) Date of Patent: Sep. 29, 2020

(54) INFORMATION PROCESSING METHOD, MOBILE DEVICE, AND INFORMATION PROCESSING PROGRAM

(71) Applicant: Rakuten, Inc., Tokyo (JP)

(72) Inventors: Yutaka Jinno, Tokyo (JP); Hideki Akashika, Tokyo (JP)

(73) Assignee: Rakuten, Inc., Shinagawa-ku, Tokyo (JP)

( * ) Notice: Subject to any disclaimer, the term of this patent is extended or adjusted under 35 U.S.C. 154(b) by 595 days.

(21) Appl. No.: 14/427,917

(22) PCT Filed: Jul. 19, 2013

(86) PCT No.: PCT/JP2013/069611
§ 371 (c)(1),
(2) Date: Mar. 12, 2015

(87) PCT Pub. No.: WO2015/008374
PCT Pub. Date: Jan. 22, 2015

(65) Prior Publication Data
US 2015/0228044 A1    Aug. 13, 2015

(51) Int. Cl.
*G06Q 50/30*    (2012.01)
*G07B 15/00*    (2011.01)
(Continued)

(52) U.S. Cl.
CPC .............. *G06Q 50/30* (2013.01); *G06F 3/16* (2013.01); *G06F 21/32* (2013.01); *G07B 15/00* (2013.01); *H04R 1/08* (2013.01); *H04R 29/00* (2013.01)

(58) Field of Classification Search
CPC .......... G06Q 50/30; G06F 3/16; G06F 21/32; G07B 15/00; H04R 1/08; H04R 29/00
See application file for complete search history.

(56) References Cited

U.S. PATENT DOCUMENTS

| 7,877,280 B2 * | 1/2011 | Jones | ..................... G06Q 10/02 |
| | | | 705/26.4 |
| 2001/0042125 A1 * | 11/2001 | Watanabe | .............. G06Q 20/04 |
| | | | 709/227 |

(Continued)

FOREIGN PATENT DOCUMENTS

| CN | 102509216 A * | 6/2012 | ............. G06Q 20/16 |
| JP | 2000-344106 A | 12/2000 | |

(Continued)

OTHER PUBLICATIONS

"Pascal Bihler, A Smartphone Museum Guide with Ultrasound Control, 2011, p. 1-3" (Year: 2011).*

(Continued)

*Primary Examiner* — George Chen
*Assistant Examiner* — Ibrahim N El-Bathy
(74) *Attorney, Agent, or Firm* — Sughrue Mion, PLLC (57) ABSTRACT

A mobile terminal inputs a sound effect output from a communication device through a microphone in response to completion of access to an IC module, and determines whether a sound pattern of the input sound effect indicates a preset sound pattern. When it is determined that the sound pattern of the input sound effect indicates the preset sound pattern, the mobile terminal displays provision information on a location where the communication device exists, on the display device that is display-controlled by the mobile terminal.

10 Claims, 4 Drawing Sheets

(51) Int. Cl.
    *G06F 21/32*     (2013.01)
    *G06F 3/16*     (2006.01)
    *H04R 1/08*     (2006.01)
    *H04R 29/00*     (2006.01)

(56) References Cited

U.S. PATENT DOCUMENTS

| | | | |
|---|---|---|---|
| 2013/0144467 A1* | 6/2013 | Kickbusch | B61L 3/006 |
| | | | 701/2 |
| 2013/0191789 A1* | 7/2013 | Calman | G06F 3/017 |
| | | | 715/863 |
| 2013/0275881 A1* | 10/2013 | Hahm | H04W 4/21 |
| | | | 715/752 |
| 2014/0022189 A1* | 1/2014 | Sheng | H04R 3/00 |
| | | | 345/173 |
| 2014/0201069 A1* | 7/2014 | Arentz | H04B 11/00 |
| | | | 705/39 |

FOREIGN PATENT DOCUMENTS

| | | |
|---|---|---|
| JP | 2002-230604 A | 8/2002 |
| JP | 2013-098666 A | 5/2013 |
| WO | 2008/053707 A1 | 5/2008 |

OTHER PUBLICATIONS

International Search Report for PCT/JP2013/069611 dated Sep. 17, 2013.

* cited by examiner

FIG.1

INFORMATION PROCESSING METHOD, MOBILE DEVICE, AND INFORMATION PROCESSING PROGRAM

CROSS REFERENCE TO RELATED APPLICATIONS

This application is a National Stage of International Application No. PCT/JP2013/069611 filed Jul. 19, 2013, the contents of all of which are incorporated herein by reference in their entirety.

TECHNICAL FIELD

The present invention relates to the technical fields of devices capable of inputting sound effects output from an access device in response to completion of access to an IC module.

BACKGROUND ART

In the past, as disclosed in Patent Literature 1, there has been known a system that automatically displays information on an operating schedule of a transportation facility, such as a subway or a bus, or local weather forecast information by individual when a user inserts an electronic time card into an electronic time recorder. In the method disclosed in Patent Literature 1, when data of the electronic time card is read by a card reading means provided in the electronic time recorder, the electronic time recorder transmits transmission data, including check-in time and check-out time, to a server, and performs a process of displaying display data transmitted from the server through a network.

PRIOR ART LITERATURE

Patent Literature

Patent Literature 1: JP 2002-230604 A

SUMMARY OF THE INVENTION

Problem to be Solved by the Invention

However, in the method described in Patent Literature 1, in order for the electronic time recorder to acquire and display data from the server, the user needs to provide a computer having a display function at all electronic time recorders available to the user. The same problem occurs when such technology is applied to, for example, a ticket gate of a transportation facility or an IC card reader installed at an entrance of a facility.

The technical problem to be solved by the present invention is to provide an information processing method, a mobile device, and an information processing program, capable of providing a user with provision information on an accessed location in response to completion of access to an IC module, without installing a computer having a display function on an external device side accessible to an IC module mounted on an IC card or a mobile terminal.

Means for Solving the Problem

In order to solve the above problem, the invention according to some embodiments is the information processing method, which is performed by a mobile device, comprising:

an inputting step of inputting a sound effect output from an access device in response to completion of access to an IC module; and a displaying step of displaying provision information on a location where the access device exists, on a display device which is display-controlled by the mobile device, in response to an input of a sound effect indicating a preset sound pattern.

According to this invention, the provision information on the accessed location can be provided to the user in response to the completion of the access to the IC module, without installing a computer having an information transmission function on an external device side capable of accessing the IC module mounted on an IC card or a mobile terminal The invention according to some embodiments is the information processing method, wherein the displaying step displays the provision information, including service information on services available to a user within a predetermined range from the location, on the display device.

According to this invention, it is possible to provide service information available to the user within a predetermined range from the accessed location.

The invention according to some embodiments is the information processing method, wherein the service information includes at least one of a scheduled time of the service, a changed scheduled time of the scheduled time, and a waiting time until the use of the service.

According to this invention, it is possible to provide the service information based on the actual conditions.

The invention according to some embodiments is the information processing method, wherein the displaying step displays the provision information, including a list of service information on each of the plurality of different services, on the display device.

According to this invention, the user convenience can be improved.

The invention according to some embodiments is the information processing method, further comprising:

a first specifying step of specifying service information on services matched with the use of the user, based on a time when the sound effect is input, a necessary time from the location to a use location of the service, and the scheduled time of the service or the changed scheduled time, wherein the service information specified by the first specifying step is displayed on the display device.

According to this invention, the service information, which becomes noise and is actually useless, can be excluded from the display object.

The invention according to some embodiments is the information processing method, further comprising:

a second specifying step of specifying service information on a high-order predetermined number of the services that is capable of early arriving at a desired location of the user, the service being a service of transportation facility that transports the user, wherein the service information specified by the second specifying step is displayed on the display device.

According to this invention, it is possible to increase the probability of satisfying the user's need.

The invention according to some embodiments is the information processing method, further comprising:

a third specifying step of specifying service information on a high-order predetermined number of services whose moving distance from the location to the use location of the service is short, wherein the service information specified by the third specifying step is displayed on the display device.

According to this invention, the user convenience can be improved.

The invention according to some embodiments is the information processing method, wherein the use location includes the easiest use location to get off or transfer at a use end location of the service, the service being a service of transportation facility that transports the user.

According to this invention, the user convenience can be improved.

The invention according to some embodiments is the information processing method, further comprising:

a sensing step of sensing access of the IC module and the access device by monitoring a state of the IC module; and a switching step of switching a microphone function for inputting the sound effect from off to on when the access is sensed by the sensing step.

The invention according to some embodiments is a mobile device comprising:

an inputting means that inputs a sound effect output from an access device in response to completion of access to an IC module; and a display controlling means that displays provision information on a location where the access device exists, on a display device which is display-controlled by the mobile device, in response to an input of a sound effect indicating a preset sound pattern.

The invention according to some embodiments is an information processing program, which causes a computer included in a mobile device to perform:

an inputting step of inputting a sound effect output from present invention.

Advantageous Effects of the Invention

According to the present invention, it is possible to provide the user with provision information on the accessed location in response to the completion of the access to the IC module, without installing a computer having a display function on an external device side capable of accessing the IC module mounted on a mobile device.

MODE FOR CARRYING OUT THE INVENTION

Hereinafter, embodiments of the present invention will be described with reference to the drawings. Also, embodiments described below are embodiments in a case where the present invention is applied to an information processing system.

[1. Schematic Configuration of Information Processing System S]

Figure 1:
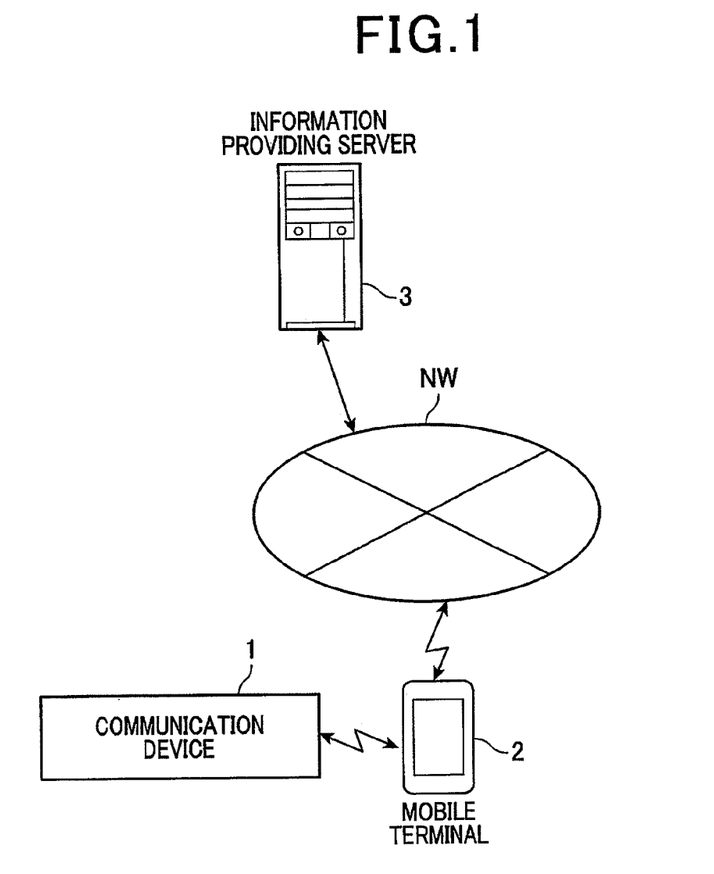
FIG. 1 is a diagram illustrating a schematic configuration example of an information processing system S according to the present embodiment.

First, the schematic configuration example of the information processing system S according to the present embodiment will be described with reference to FIG. 1 or the like. FIG. 1 is a diagram illustrating a schematic configuration example of an information processing system S according to the present embodiment. As illustrated in FIG. 1, the information processing system S according to the present embodiment includes a communication device 1 and a mobile terminal 2. The communication device 1 is an example of an access device according to the present invention and is a device that accesses an IC module in a non-contact manner and outputs a sound effect according to completion of the access. The communication device 1 is installed in, for example, a ticket gate of a transportation facility (for example, railroad), a tollgate of a toll road (for example, expressway), an entrance/exit gate of a facility (for example, a building, a restaurant district, an amusement park, a movie theater, and the like), an inside of a vehicle of a transportation facility (for example, a bus, a taxi, and the like), a checkout counter of a shop, and the like. Also, the communication device 1 may be installed in an entrance/exit gate of an airplane or a ship. The communication device 1 is used for various purposes, such as a payment of an electronic value or a user authentication. On the other hand, the mobile terminal 2 is an example of a mobile device according to the present invention. For example, a smartphone, a mobile phone, a game machine, a tablet computer, and the like can be applied. The mobile terminal 2 can access an information providing server 3 through a network NW. The network NW is configured by a dedicated line, a mobile communication network, the Internet, and the like.

Figure 2A:
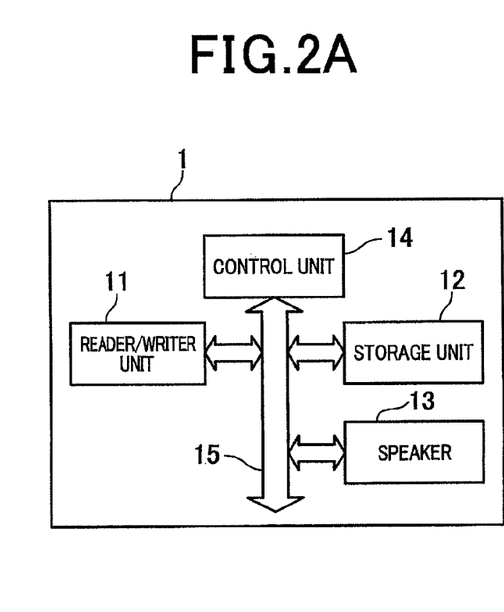
FIG. 2A is a diagram illustrating a schematic configuration example of a communication device 1 according to the present embodiment.

FIG. 2A is a diagram illustrating a schematic configuration example of the communication device 1 according to the present embodiment. As illustrated in FIG. 2A, the communication device 1 is configured using a reader/writer unit 11, a storage unit 12, a speaker 13, and a control unit 14. Each of the reader/writer unit 11, the storage unit 12, and the speaker 13 is connected to the control unit 14 through an input/output interface unit (not illustrated) and a bus 15.

The reader/writer unit 11 includes, for example, a reader and an antenna adopting a near field communication (NFC) technology using a frequency of 13.56-MHz band. The reader/writer unit 11 communicates with an IC module close to a distance range where the near field communication is possible by an electromagnetic wave (carrier wave).

The storage unit 12 is configured by, for example, nonvolatile memory such as flash memory or EEPROM. An operating system or an application program is stored in the storage unit 12. Examples of the application program include an electronic value payment processing program and an authentication processing program. The contents of such programs are different according to the purpose of the communication device 1.

The control unit 14 is configured by, for example, a CPU, ROM, and RAM. When the reader/writer unit 11 accesses the IC module, the control unit 14 performs a predetermined process according to the program and outputs a sound effect from the speaker 13 according to completion of the access. Examples of the process include an electronic value payment process and an authentication process.

For example, in the electronic value payment process, the control unit 14 compares the balance of the electronic value acquired from the IC module through the reader/writer unit 11 with payment amount. When the balance is more than the payment amount, the control unit 14 transmits log information (log data) about the corresponding payment and balance change information changing the balance of the electronic value (that is, reducing the balance by the payment amount) to the IC module through the reader/writer unit 11. Due to the balance change information, the balance of the electronic value stored in the IC module is rewritten. Also, log information is written to the IC module. A process completion notification is replied from the IC module to the reader/writer unit 11. The control unit 14 outputs a sound effect indicating normal completion of the corresponding payment process, in response to the completion of the access by the reception of the process completion notification. The log information includes information such as an e-money number, a payment date, a payment amount, and a balance after payment. Also, for example, log information of the payment process at the ticket gate of the transportation facility includes information on a boarding station name (so-called boarding data). On the other hand, when the balance is less than the payment amount, the control unit 14 outputs a sound effect indicating abnormal completion of the payment process (error). Also, in the payment process, the control unit 14 may be configured to transmit a communication device ID (identification information identifying the communication device 1) to the IC module through the reader/writer unit 11. In this case, the corresponding communication device ID is written to the IC module.

Also, for example, in the authentication process, the control unit 14 compares authentication information (for example, a user ID of the user of the mobile terminal 1 (identification information identifying the user) or authentication code) acquired from the IC module through the reader/writer unit 11 with authentication information managed by the communication device 1. When both of pieces of the authentication information are matched with each other, the control unit 14 transmits authentication result information indicating normal completion of the authentication process to the reader/writer unit 11 through the IC module. Therefore, authentication result information is written to the IC module. A process completion notification is replied from the IC module to the reader/writer unit 11. The control unit 14 outputs a sound effect indicating the normal completion of the corresponding authentication process, in response to the completion of the access by the reception of the process completion notification. The authentication result information includes authentication information, the indication of authentication success, and an authentication date. On the other hand, when both of pieces of the authentication information are not matched with each other, the control unit 14 outputs a sound effect indicating abnormal completion of the authentication process (error).

Figure 2B:
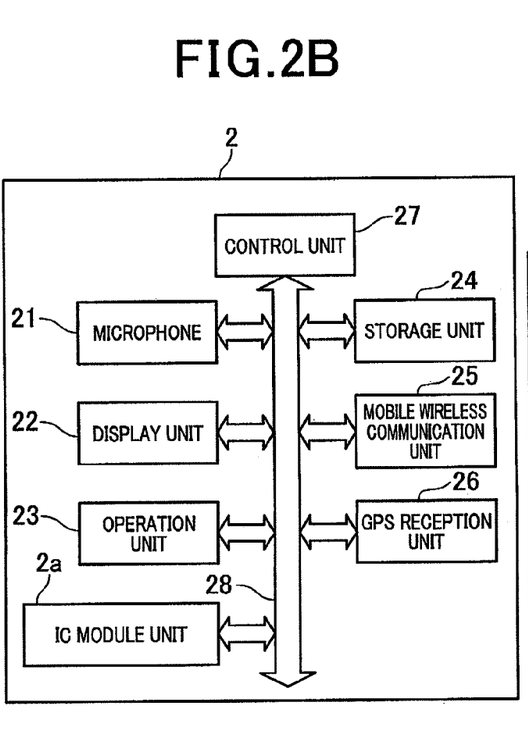
FIG. 2B is a diagram illustrating a schematic configuration diagram of a mobile terminal 2 according to the present invention.

FIG. 2B is a diagram illustrating a schematic configuration example of the mobile terminal 2 according to the present embodiment. As illustrated in FIG. 2B, the mobile terminal 2 is configured to include a microphone 21, a display unit 22, an operation unit 23, a storage unit 24, a mobile wireless communication unit 25, a global positioning system (GPS) reception unit 26, and a control unit 27. The microphone 21, the display unit 22, the operation unit 23, the storage unit 24, the mobile wireless communication unit 25, and the GPS reception unit 26 are connected to the control unit 27 through an input/output interface unit (not illustrated) and a bus 28. Also, a battery (not illustrated) as a power supply is embedded in the mobile terminal 2 and supplies power to the microphone 21, the display unit 22, the operation unit 23, the storage unit 24, the mobile wireless communication unit 25, the GPS reception unit 26, and the control unit 27.

Furthermore, an IC module unit 2a, which is connected to the control unit 27 through the input/output interface (not illustrated) and the bus 28, is embedded in the mobile terminal 2. The IC module unit 2a includes, for example, an IC module and an antenna adopting an NFC technology as described above. The IC module is configured by, for example, a non-contact IC chip including a CPU, ROM, RAM, and nonvolatile memory. The IC module may be configured to be directly incorporated on a circuit board of the mobile terminal 2. When the IC module unit 2a is used in the electronic value payment process, for example, the balance of the electronic value, the log information, and the e-money number are stored in the nonvolatile memory. Also, when the IC module unit 2a is used in the authentication process, the authentication result information is stored in the nonvolatile memory. Also, the communication device ID transmitted from the reader/writer unit 11 of the communication device 1 may be stored in the nonvolatile memory. Also, the IC module includes a plurality of terminals connected to the antenna and the input/output interface unit 27. When an electromagnetic wave of a specific frequency (for example, 13.56-MHz carrier wave) is detected, a voltage state at a specific terminal among the plurality of terminals is switched from off to on. The on/off state of the specific terminal is monitored as a state of the IC module by the control unit 27.

The microphone 21 is provided for inputting a sound from the outside. In the present embodiment, the microphone 21 inputs a sound effect output from the speaker 13 of the communication device 1. The microphone function for inputting the sound effect by the microphone 21 is turned off when the communication device 1 does not access the mobile terminal 2, and power is not supplied from the battery when the microphone function is turned off.

The display unit 22 is an example of a display device that is display-controlled by the control unit 27, and is configured by, for example, a touch panel display. User-specified icons or user provision information is displayed on the display according to a control signal from the control unit 27. Also, the display device that is display-controlled by the control unit 27 may be glasses with display function capable of communicating with the mobile terminal 2 by wire or wireless. The glasses with display function includes a lens being a transparent display, and a display unit displaying information output from the control unit 27 on the lens.

The operation unit 23 is configured by an input button for inputting an instruction from the user. The operation unit 23 can input the instruction through the icon displayed on the touch screen display.

The storage unit 24 is configured by, for example, nonvolatile memory such as flash memory or EEPROM. An operating system and an application program (including an information processing program of the present invention) are stored in the storage unit 24. The application program is a program that causes the control unit 27 of the mobile terminal 2 to execute an information processing method which is to be described below. The application program of the present embodiment causes the control unit 27 to execute at least a step of inputting a sound effect output from the speaker 13 of the communication device 1, and a displaying step of displaying provision information on a location where the communication device 1 exists on the display unit 22, which is display-controlled by the mobile terminal 2, or glasses with display function, in response to an input of a sound effect indicating a preset sound pattern. Also, the application program, for example, may be downloaded from a predetermined server or the like through the network NW, or may be stored in and read from a predetermined recording medium, such as an external USB memory, a CD, and a DVD. Also, the information processing method of the present invention may be performed by, for example, a logic circuit (hardware) established in the control unit 27.

Also, the storage unit 24 stores pattern data corresponding to the sound pattern of the sound effect. The sound pattern of the sound effect is defined by, for example, a frequency characteristic of the sound effect (for example, characteristic indicating a sound pressure level of each predetermined frequency). The pattern data is generated by, for example, a frequency analysis of a sound effect actually output from the communication device 1. The generated pattern data is set and stored as data that can be referenced by the application program. Also, as described above, the sound pattern of the sound effect output from the communication device 1 may be different according to the processing result of the communication device 1. For example, there are a sound pattern when the access has been completed by the normal completion of the process in the communication device 1 (hereinafter, referred to as "normal sound pattern") and a sound pattern when the access has been completed by the abnormal completion of the process in the communication device 1 (error) (hereinafter, referred to as "error sound pattern"). In this case, pattern data corresponding to the respective sound patterns are stored in the storage unit 24, and the respective pattern data are associated with the contents of the information display process that are executed by the control unit 27. The correspondence relationship between the pattern data and the contents of the information display process may be defined in the application program of the present invention, or may be defined in a table stored in the storage unit 24.

The mobile wireless communication unit 25 is configured to perform wireless communication with a base station in a mobile wireless communication network. Therefore, the control unit 27 can access an information providing server 3 through the network NW. The GPS reception unit 26 receives a navigation radio wave output from a GPS satellite, and detects location information (latitude and longitude) based on the received signal.

Figure 2C:
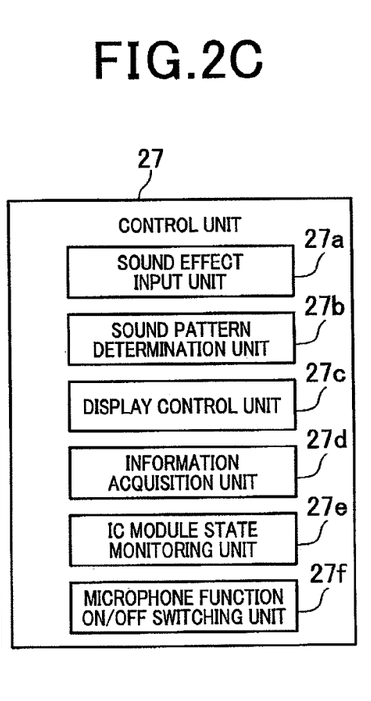
FIG. 2C illustrates an exemplary control unit.

The control unit 27 is configured by, for example, a CPU, ROM, and RAM. FIG. 2B is a diagram illustrating an example of a function block of the control unit 27. The control unit 27 as a computer executes, for example, a process according to the application program stored in the storage unit 24. In this process, as illustrated in FIG. 2C, the control unit 27 functions as a sound effect input unit 27a, a sound pattern determination unit 27b, a display control unit 27c, an information acquisition unit 27d, an IC module state monitoring unit 27e, and a microphone function on/off switching unit 27f. Also, the sound effect input unit 27a is an example of an inputting means of the present invention. The display control unit 27c is an example of a display controlling means of the present invention.

The sound effect input unit 27a inputs a sound effect output from the communication device 1 through the microphone 21 in response to the completion of the access to the IC module unit 2a. The sound pattern determination unit 27b determines whether the sound pattern of the sound effect input through the microphone 21 indicates a preset sound pattern (that is, sound pattern corresponding to the pattern data stored in the storage unit 24). Herein, the sound pattern of the input sound effect is acquired by, for example, the frequency analysis of the corresponding sound effect. For example, when a difference value acquired by the pattern comparison between the sound pattern of the sound effect input through the microphone 21 and the sound pattern corresponding to the pattern data stored in the storage unit 24 is within a threshold value, it is determined that the sound pattern of the input sound effect indicates the preset sound pattern.

Also, as described above, the pattern data corresponding to the normal sound pattern and the pattern data corresponding to the error sound pattern may be stored in the storage unit 24. In this case, the sound pattern determination unit 27b may be configured to determine whether the sound pattern of the input sound effect indicates the normal sound pattern or indicates the error sound pattern, based on the pattern data.

The display control unit 27c displays provision information on the location where the communication device 1 exists, on the display unit 22 or the display unit of the glasses with display function in response to the input of the sound effect indicating the preset sound pattern. When it is determined that the sound pattern of the input sound effect indicates the preset sound pattern, the display control unit 27c displays provision information on the location where the communication device 1 exists, on the display device that is display-controlled by the display control unit 27c. Also, for example, the display control unit 27c may be configured to display provision information on the location where the communication device 1 exists, only when a sound effect corresponding to a sound pattern indicating that a payment of a transaction has been normally completed (that is, when it is determined that a sound pattern of an input sound effect indicates a normal sound pattern). Alternatively, when a sound effect corresponding to a normal sound pattern is input and when a sound effect corresponding to an error sound pattern is input, different provision information may have different contents.

Herein, for example, service information on services available to the user within a predetermined range from the corresponding location is included in the provision information on the location where the communication device 1 exists. For example, the predetermined range corresponds to a facility (for example, a station, a shopping mall, an amusement park, or a movie theater) existing at the corresponding location within several tens of m in radius from the corresponding location. The service corresponds to a train in the railroad (example of a service of a transportation facility that transports a user), a meal offering (or product sale) or an event in the shopping mall, attraction in the amusement park, or a movie in the movie theater. Also, for example, the service information includes at least one of the contents of the service, the use location of the service, and the scheduled time of the service.

For example, when the service is the train in the railroad, the service information includes a route name and a destination of the train (example of the contents of the service), a boarding location of the train (for example, track name: example of the use location of the service), and a departure time of the train (time table) (example of the scheduled time of the service). Also, when the departure time of the train is changed (for example, delayed), a changed departure time (example of the changed scheduled time) may be included in the service information. Therefore, it is possible to provide the service information based on the actual conditions.

Also, when the service is the meal offering (or product sale) in the shopping mall, the service information includes a shop name of a shop performing the meal offering (or product sale) and an overview of food (product description) (example of the contents of the service), a location of a shop (for example, installation area name and location name: example of the use location of the service), and a business hour of a shop (example of the scheduled time of the service). Also, when the service is the event in the shopping mall, the service information includes an event name and an overview of an event (example of the contents of the service), a site of the event (for example, site name and location name: example of the use location of the service), and an event start time (example of the scheduled time of the service). Also, when the event start time is changed (for example, delayed), a changed start time (example of the changed scheduled time) may be included in the service information. In addition to or alternative to the event start time or the changed start time, a waiting time until the use of the service related to the event (time for which the user has to wait until the user can use the service) may be included in the service information.

Also, when the service is the attraction in the amusement park, the service information includes an attraction name and an overview of an attraction (example of the contents of the service), a site of the attraction (for example, site name and location name: example of the use location of the service), and an opening time of the attraction (example of the scheduled time of the service). Also, when the opening time of the attraction is changed (for example, delayed), a changed opening time (example of the changed scheduled time) may be included in the service information. In addition to or alternative to the opening time or the changed opening time of the attraction, a waiting time until the use of the attraction (time for which the user has to wait until the user can use the attraction) may be included in the service information.

Also, when the service is the movie in the movie theater, the service information includes a movie title and an overview of a movie (example of the contents of the service), a movie screening site (for example, screening hall name: example of the use location of the service), and a screening start time of the movie (example of the scheduled time of the service). Also, when the screening start time of the movie is changed (for example, delayed), a changed screening start time (example of the changed scheduled time) may be included in the service information. Also, in addition to or alternative to the screening start time and the changed screening start time of the movie, a waiting time until screening (time for which the user has to wait until the user can use the service) may be included in the service information.

Also, when the communication device 1 is installed in the vehicle (for example, a taxi or a bus) of the transportation facility, for example, service information on services available to the user within a predetermined range from the location, or map information indicating a location of a facility available to the user as map information within a predetermined range from the corresponding location is included in the provision information on the location where the communication device 1 exists. Also, when the communication device 1 is installed in a checkout counter of a shop, for example, special information provided by the corresponding shop (for example, a coupon book, points, or the like) or advertisement information of products sold at the corresponding shop is included in the provision information on the location where the communication device 1 exists.

The provision information (candidate) on the location where the communication device 1 exists is stored in the IC module, the storage unit 24, or the information providing server 3 in association with, for example, the location where the communication device 1 exists, the facility existing at the corresponding location, or identification information that can identify the services available to the user within a predetermined range from the corresponding location. For example, the identification information corresponds to the location information on the location where the communication device 1 exists) (for example, latitude and longitude, address, or the like), the name of the corresponding location or the name of the facility existing at the corresponding location, and the communication device ID of the communication device 1 existing at the corresponding location. Also, for example, the identification information corresponds to authentication codes related to the services available within a predetermined range from the corresponding location. For example, when a sound effect indicating a preset sound pattern is input, the information acquisition unit 27*d* accesses the communication device 1, acquires information written to the IC module (nonvolatile memory) from the IC module unit 2*a*, and acquires identification information from the acquired information. Alternatively, when the sound effect indicating the preset sound pattern is input, the information acquisition unit 27*d* may acquire location information detected by the GPS reception unit 26 (GPS function) as the identification information. The information acquisition unit 27*d* acquires the provision information related to the identification information from the IC module, the storage unit 24, or the information providing server 3, based on the acquired identification information.

Also, when the sound effect indicating the preset sound pattern is input, the information acquisition unit 27*d* may be configured to access the communication device 1, acquire the communication device ID written in the IC module from the IC module unit 2*a*, and acquire the location information searched by using the acquired communication device ID as a key. Also, the location information may be searched by the information providing server 3 that can be accessed through the network NW by the mobile terminal 2, or may be searched by the control unit 27 from a location information list (list indicating the correspondence relationship between the communication device 1 of the fixedly installed communication device 1 and the location information) stored in the storage unit 24.

The IC module state monitoring unit 27*e* senses the access of the IC module and the communication device 1 (reader/writer unit 11) by monitoring the state of the IC module. For example, the IC module state monitoring unit 27*e* senses the access of the IC module and the communication device 1 (reader/writer unit 11) by detecting that a voltage state at a specific terminal of the IC module is switched from off to on by an electromagnetic wave generated from the reader/writer unit 11. The microphone function on/off switching unit 27*f* may be configured such that the microphone function for inputting the above-described sound effect is switched from off to on when the access is sensed by the IC module state monitoring unit 27*e*. Therefore, the microphone function need not be always turned on and the consumption of the battery can be suppressed.

[2. Operation of Information Processing System S]

Next, the operation of the information processing system S according to the present embodiment will be described.

Embodiment 1

Figure 3:
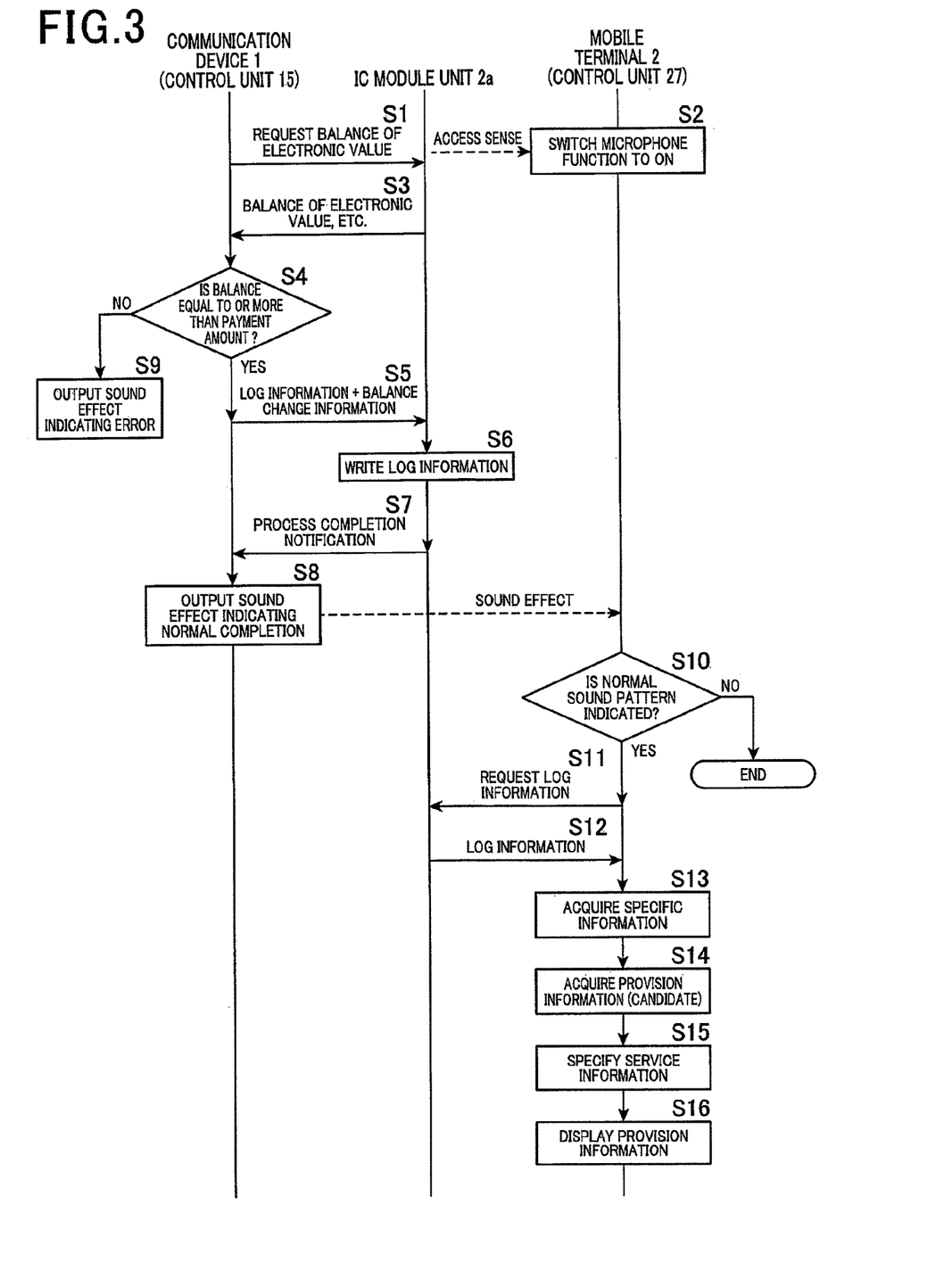
FIG. 3 is a sequence diagram illustrating an operation when an electronic value payment process is performed.

In Embodiment 1, for example, a case where a communication device 1 installed in a ticket gate of a railroad performs an electronic value payment process will be described below with reference to FIG. 3. FIG. 3 is a sequence diagram illustrating an operation when an electronic value payment process is performed.

In FIG. 3, when the user puts the mobile terminal 2 on the reader/writer unit 11 of the communication device 1 at the ticket gate, the control unit 14 of the communication device 1 accesses the IC module unit 2a of the mobile terminal 2 through the reader/writer unit 11 and requests the IC module unit 2a of the mobile terminal 2 for the e-money number and the current balance of the electronic value (step S1). When the control unit 27 of the mobile terminal 2 senses the access of the IC module and the communication device 1 (reader/writer unit 11) by monitoring the state of the IC module, the control unit 27 of the mobile terminal 2 switches the microphone function from off to on (step S2). Therefore, the microphone function need not be always turned on and the consumption of the battery can be suppressed. Also, the control unit 27 of the mobile device 2 may be configured to acquire location information from the GPS reception unit 26 and switch the microphone function from off to on only when it is determined that the communication device 1 exists near the location indicated by the location information (for example, within several meters) In this case, the control unit 27 of the mobile terminal 2 may be configured to previously acquire the location information, which indicates the location of the communication device 1 installed at the ticket gate, from the information providing server 3.

On the other hand, the IC module unit 2a of the mobile terminal 2 reads the e-money number and the balance of the electronic value stored in the nonvolatile memory in response to a request from the communication device 1, and transmits the e-money number and the balance of the electronic value to the communication device (step S3).

The control unit 14 of the communication device 1 determines whether the balance is equal to or more than the payment amount by comparing the balance of the electronic value received from the IC module unit 2a through the reader/writer unit 11 with the payment amount (for example, minimum freight charge) (step S4). When the balance is equal to or more than the payment amount (step S4: YES), the control unit 14 of the communication device 1 transmits log information on the relevant payment and balance change information, which reduces the balance of the electronic value by the payment amount, to the IC module unit 2a through the reader/writer unit 11 (step S5). Also, the control unit 14 of the communication device 1 may be configured to transmit a communication device ID to the IC module unit 2a through the reader/writer unit 11. When the IC module unit 2a of the mobile terminal 2 receives the balance change information and the log information from the communication device 1, the IC module unit 2a of the mobile terminal 2 executes a balance change process of reducing the balance of the electronic value, which is stored in the nonvolatile memory, by the payment amount, and writes the log information to the nonvolatile memory (step S6), and replies the process completion notification to the communication device 1 (step S7). Also, when the IC module unit 2a of the mobile terminal 2 receives a communication device ID from the communication device 1, the IC module unit 2a of the mobile terminal 2 writes the communication device ID to the nonvolatile memory.

When the control unit 14 of the communication device 1 receives the process completion notification from the IC module unit 2a, the control unit 14 of the communication device 1 outputs a sound effect indicating normal completion of the payment process from the speaker 13, in response to completion of access by the reception of the process completion notification (in Embodiment 1, the end of transaction) (step S8). On the other hand, when the balance is less than the payment amount (step S4: NO), the control unit 14 of the communication device 1 outputs a sound effect including abnormal completion of the payment process (error) from the speaker 13, in response to the completion of the access (step S9).

When the control unit 27 of the mobile terminal 2 inputs the sound effect output from the speaker 13 of the communication device 1 through the microphone 21, the control unit 27 of the mobile terminal 2 determines whether a sound pattern of the input sound effect indicates a preset normal sound pattern (step S10). Also, when the sound effect is input by the microphone 21 (when the sound effect is detected), the control unit 27 of the mobile terminal 2 switches the microphone function from on to off. Therefore, the microphone function need not be always turned on and the consumption of the battery can be suppressed.

When it is determined that the sound pattern of the input sound effect indicates the normal sound pattern (step S10: YES), the control unit 27 of the mobile terminal 2 starts an information display process corresponding to the normal sound pattern, and requests the IC module unit 2a for log information (that is, latest log information) written to the nonvolatile memory in step S6 (step S11). The IC module unit 2a of the mobile terminal 2 reads the log information stored in the nonvolatile memory in response to a request from the control unit 27, and outputs the log information to the control unit 27 (step S12). On the other hand, when it is determined that the sound pattern of the input sound effect does not indicate the normal sound pattern (step S10: NO), the process is ended. For example, when the error sound pattern indicating the lack of the balance is input, the user needs a charging time. Therefore, the provision information including the departure time of the train or the like is not displayed. Also, when it is determined that the sound pattern of the input sound effect does not indicate the normal sound pattern, the sound pattern of the input sound effect may be configured to determine whether the sound pattern of the input sound effect indicates the preset error sound pattern. When it is determined that the sound pattern of the input sound effect indicates the preset error sound pattern, the control unit 27 of the mobile terminal 2 may be configured to perform the information display process corresponding to the error sound pattern.

When the control unit 27 of the mobile terminal 2 acquires the log information from the IC module unit 2a, the control unit 27 of the mobile terminal 2 determines the boarding station name from the log information as the identification information (step S13). Also, the control unit 27 of the mobile terminal 2 may acquire the location information from the GPS reception unit 26 as the identification information. Also, the control unit 27 of the mobile terminal 2 may be configured to access the communication device 1, acquire the communication device ID written in the IC module from the IC module unit 2a, and acquire the location information, which is searched by using the acquired communication device ID as a key, as the identification information.

Subsequently, the control unit 27 of the mobile terminal 2 acquires the provision information related to the identification information from the storage unit 24 or the information providing server 3, based on the identification information acquired in step S13 (step S14). For example, the control unit 27 of the mobile terminal 2 transmits the identification information to the information providing server 3, and acquires the provision information, which is searched by the information providing server 3 by using the acquired identification information as a key, from the information providing server 3. Service information including a route name and a destination of a train, a boarding location of the train, and a departure time of the train (time table) is included in the acquired provision information. Also, when the departure time of the train is delayed, the delayed departure time may be included in the service information.

Subsequently, the control unit 27 of the mobile terminal 2 specifies one or more pieces of service information provided to the user, from the provision information (candidate) acquired in step S14 (step S15). For example, the control unit 27 of the mobile terminal 2 acquires a current time (that is, time when the sound effect is input) from the clock function, specifies service information including the route name and the destination of the train, the boarding location of the train, and the departure time of the train that is scheduled to depart within a predetermined time (for example, 10 minutes) from the current time. Therefore, the control unit 27 of the mobile terminal 2 may acquire map data including information indicating a distance or a necessary time between the points of the station. In this case, the control unit 27 of the mobile terminal 2 may be configured to specify service information related to the train, which the user of the mobile terminal 2 can get on, based on the acquired current time, a necessary time from the ticket gate (location specified by the identification information) to the boarding location of the train, and an expected departure time of the train (or delayed expected departure time). For example, when the necessary time from the current location of the user (that is, near the ticket gate) to the boarding location is 3 minutes, service information on trains that will departure within 3 minutes from the current time is excluded (excluding from identification information). Therefore, the service information, which becomes noise and is actually useless, can be excluded from the display object. Also, the control unit 27 of the mobile terminal 2 may calculate a moving distance from the ticket gate to the boarding location of the train with respect to each service information, and specify the service information related to a predetermined number of trains (for example, one or two trains) whose calculated moving distance is short in descending order. At the boarding location, the boarding location easiest to get off or transfer at the use end location of the train (for example, the target station or in the middle) may be included. Therefore, the user convenience can be improved. Also, the control unit 27 of the mobile terminal 2 may be configured to specify service information related to a predetermined number of trains that can early arrive at the desired station (example of the destination) of the user of the mobile terminal 2 in descending order. Therefore, it is possible to increase the probability of satisfying the user's need. Also, the desired station of the user may be previously set by the user, and may be specified from the transfer search history of the user or the train use history of the user.

Subsequently, the control unit 27 of the mobile terminal 2 displays the provision information, including the service information specified in step S15, on the display unit 22 or the display unit of the glasses with display function (step S16). Also, when a plurality of different service information is specified in step S15, for example, the control unit 27 of the mobile terminal 2 displays service information related to a train having the shortest distance from the ticket gate to the boarding location of the train. Also, when a plurality of different service information is specified in step S15, the control unit 27 of the mobile terminal 2 may display service information including trains that can more early arrive at the desired station (example of the destination) of the user of the mobile terminal 2. Also, when a plurality of different service information is specified in step S15, the control unit 27 of the mobile terminal 2 may display provision information including a list of the plurality of service information. For example, when there are a plurality of lines of trains available from the current station where the user stands to the desired station or the middle station (in a case where there are Y line, X line, Z line), the service information including departure time (time table) of trains of each line is displayed. Therefore, even though any train is used, the use is easily determined, thereby increasing the user convenience. Also, for example, the displayed provision information is stored in the storage unit 24 so that the user can reference the provision information later. Also, when other application (for example, email program or browser) is started at the time of displaying the provision information, only an icon indicating the provision information may be displayed without displaying the provision information.

Also, Embodiment 1 is an example when the present invention is applied to the payment process by the electronic value, but Embodiment 1 can also be applied to a payment process by a credit card. In this case, for example, when a credit card number, an expiration date, or the like acquired from the IC module unit 2*a* of the mobile terminal 2 through the reader/writer unit 11, the communication device 1 transmits a request for a credit inquiry (authorization) including a payment amount or the like together with the credit card number and the expiration date, to a payment processing server through the network NW. When the payment processing server receives the request for the credit inquiry from the communication device 1, the payment processing server processes the credit inquiry of the user and transmits credit card availability information to the communication device 1. When the received availability information indicates "available", the communication device 1 outputs a sound effect indicating the normal completion of the corresponding payment process from the speaker 13. When the sound pattern of the input sound effect indicates the preset sound pattern, the mobile terminal 2 displays the provision information related to the location where the communication device 1 exists, on the display unit 22 or the display unit of the glasses with display function.

Embodiment 2

Figure 4:
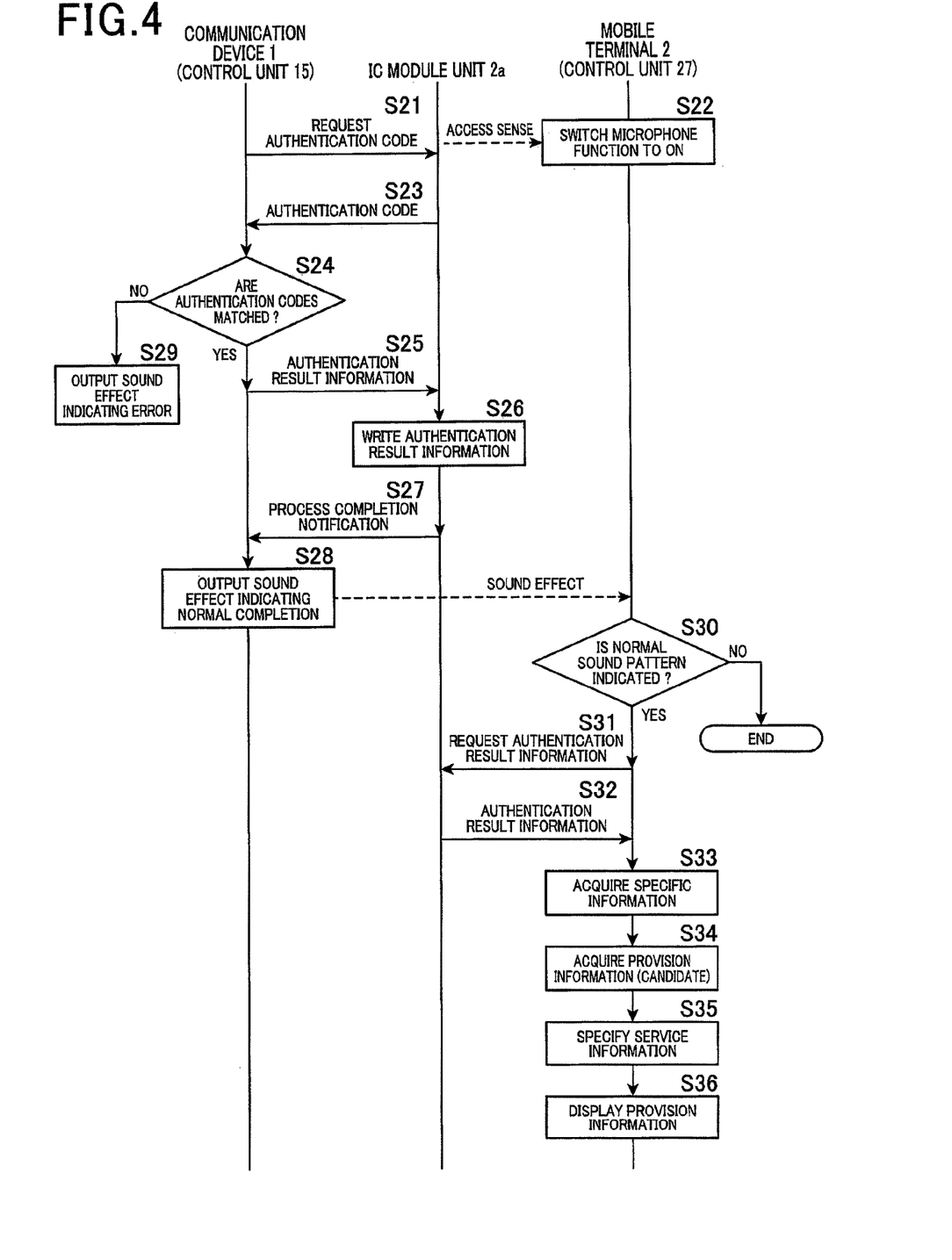
FIG. 4 is a sequence diagram illustrating an operation example when an authentication process is performed.

In Embodiment 2, for example, a case where a communication device 1 installed in an entrance gate of an amusement park or an entrance gate of a movie theater performs an authentication process will be described below with reference to FIG. 4. FIG. 4 is a sequence diagram illustrating an operation example when an authentication process is performed. Also, assuming the operation of Embodiment 2, an electronic ticket for entering the amusement park (hereinafter, referred to as "electronic ticket of amusement park"), or an electronic ticket for viewing a specific movie (reserved by the user) at a movie theater (hereinafter, referred to as "electronic ticket of movie) is purchased at a ticket selling shop and is stored in the IC module. In the electronic ticket of the amusement park, for example, an authentication code for entering the amusement park, an overview of attraction at the amusement park, and a uniform resource locator (URL) indicating a source of service information on attractions at the amusement park are included. In the electronic ticket of the movie, for example, an authentication code for entering the movie theater, an overview of a specific movie at the movie theater, and a URL indicating an address to service information on the specific movie at the corresponding movie theater are included In FIG. 4, when the user puts a mobile terminal 2 on a reader/writer unit 11 of the communication device 1 at the entrance gate of the amusement park or the entrance gate of the movie theater, a control unit 14 of the communication device 1 accesses an IC module unit 2a of the mobile terminal 2 through the reader/writer unit 11 and requests the IC module unit 2a of the mobile terminal 2 for the authentication code for using a predetermined service (step S21). When a control unit 27 of the mobile terminal 2 senses the access of the IC module and the communication device 1 (the reader/writer unit 11) by monitoring the state of the IC module, the control unit 27 of the mobile terminal 2 switches a microphone function from off to on (step S22). On the other hand, the IC module unit 2a of the mobile terminal 2 reads the authentication code stored in the nonvolatile memory in response to a request from the communication device 1, and outputs the authentication code to the communication device 1 (step S23).

The control unit 14 of the communication device 1 compares the authentication code received from the IC module unit 2a through the reader/writer unit 11 with the authentication code managed by the communication device 1, and determines whether both of the authentication codes are matched with each other (step S24). When both of the authentication codes are matched with each other (step S24: YES), the control unit 14 of the communication device 1 transmits authentication result information indicating completion of the authentication process to the IC module through the reader/writer unit 11 (step S25). When the IC module unit 2a of the mobile terminal 2 receives the authentication result information from the communication device 1, the IC module unit 2a of the mobile terminal 2 writes the authentication result information to the nonvolatile memory (step S26) and replies a process completion notification to the communication device 1 (step S27).

When the control unit 14 of the communication device 1 receives the process completion notification from the IC module unit 2a, the control unit 14 of the communication device 1 outputs a sound effect indicating the normal completion of the authentication process from a speaker 13, in response to completion of access by the reception of the process completion notification (step S28). On the other hand, when both of the authentication codes are not matched with each other (step S24: NO), the control unit 14 of the communication device 1 outputs a sound effect including abnormal completion of the payment process (error) from the speaker 13, in response to the completion of the access (step S29).

When the control unit 27 of the mobile terminal 2 inputs the sound effect output from the speaker 13 of the communication device 1 through a microphone 21, the control unit 27 of the mobile terminal 2 determines whether a sound pattern of the input sound effect indicates a preset normal sound pattern (step S30). Also, when the sound effect is input by the microphone 21 (when the sound effect is detected), the control unit 27 of the mobile terminal 2 switches the microphone function from on to off.

When it is determined that the sound pattern of the input sound effect indicates the normal sound pattern (step S30: YES), the control unit 27 of the mobile terminal 2 starts an information display process corresponding to the normal sound pattern, and requests the IC module unit 2a for the authentication result information (that is, latest authentication result information) written to the nonvolatile memory in step S26 (step S31). The IC module unit 2a of the mobile terminal 2 reads the authentication result information stored in the nonvolatile memory in response to a request from the control unit 27, and outputs the authentication result information to the control unit 27 (step S32). On the other hand, when it is determined that the sound pattern of the input sound effect does not indicate the normal sound pattern (step S30: NO), the process is ended.

When the control unit 27 of the mobile terminal 2 acquires the authentication result information from the IC module unit 2a, the control unit 27 of the mobile terminal 2 acquires the authentication code included in the authentication result information as the identification information (step S33). Subsequently, the control unit 27 of the mobile terminal 2 acquires the provision information related to the identification information from the IC module or the information providing server 3, based on the identification information acquired in step S33 (step S34). For example, the control unit 27 of the mobile terminal 2 acquires the electronic ticket including the authentication code from the IC module unit 2a, and acquires the provision information from the acquired electronic ticket. Alternatively, the control unit 27 of the mobile terminal 2 accesses the URL included in the acquired electronic ticket and acquires the provision information. When the service is the attraction, the attraction name and the overview of the attraction, the site of the attraction, and the opening time of the attraction are included in the provision information. Also, when the opening time of the attraction is delayed, the delayed opening time may be included in the service information. Also, when the service is the movie, the movie title and the overview of the movie, the movie screening site (hall number), and the screening start time of the movie are included in the provision information. Also, when the screening start time of the movie is delayed, the delayed screening start time may be included in the service information. Also, in the case of the movie, the way and the necessary time from the screening gate to the screening hall are included in the provision information.

Subsequently, the control unit 27 of the mobile terminal 2 specifies one or more pieces of service information provided to the user, from the provision information (candidate) acquired in step S34 (step S35). For example, when the service is the attraction, the control unit 27 of the mobile terminal 2 acquires the current time from the clock function, and specifies service information including the attraction name of the attraction to be held within a predetermined time (for example, within 12 hours) from the current time, the overview of the attraction, the site of the attraction, and the opening time of the attraction. Alternatively, for example, the control unit 27 of the mobile terminal 2 may specify service information including the way and the necessary time to the attraction intended in the future, and a waiting time until the use of the corresponding attraction, according to user preference information stored in the storage unit 24. Therefore, the control unit 27 of the mobile terminal 2 may acquire map data including information indicating a distance or a necessary time between the points of the amusement park. In this case, the control unit 27 of the mobile terminal 2 may be configured to specify service information related to the attraction matched with the use of the user of the mobile terminal 2, based on the acquired current time, the necessary time to the site of the attraction, and the opening time of the attraction (or delayed opening time). For example, when the necessary time from the current location of the user (that is, near the entrance gate of the amusement park) to the site of the attraction is 3 minutes, service information on attractions that will be held within 3 minutes from the current time is excluded. Also, the control unit 27 of the mobile terminal 2 may calculate a moving distance from the entrance gate of the amusement park to the site of the attraction with respect to each service information, and specify the service information related to a predetermined number of attractions (for example, one or two attractions) whose calculated moving distance is short in descending order. Also, when the service is the movie, the control unit 27 of the mobile terminal 2 specifies the provision information acquired in step S35. That is, the service information on the movie reserved by the user is specified.

Subsequently, the control unit 27 of the mobile terminal 2 displays the provision information, including the service information specified in step S35, on the glasses with display function or the display unit (step S36). Also, when a plurality of different service information on attraction is specified in step S35, for example, the control unit 27 of the mobile terminal 2 displays service information related to trains having the shorter distance from the ticket gate to the boarding location of the train. Also, when a plurality of different service information on attraction is specified in step S35, the control unit 27 of the mobile terminal 2 may display provision information including a list of the plurality of service information.

As described above, according to the embodiments, the mobile terminal 2 is configured to input the sound effect output from the communication device 1 in response to the completion of the access to the IC module unit 2a and display the provision information on the location where the communication device 1 exists, in response to the input of the sound effect indicating the preset sound pattern. Therefore, the mobile terminal 2 can provide the user with the provision information on the accessed location in response to the completion of the access to the IC module, without installing a computer having a display function on the external communication device 1 side capable of accessing the IC module unit 2a mounted on the mobile terminal 2. Also, for example, even though the computer having the display function is installed at the ticket gate or the entrance/exit gate, if the user of the mobile terminal 2 is separated from the ticket gate or the entrance/exit gate, there is an inconvenience in that the information displayed on the ticket gate or the entrance/exit gate cannot be seen. However, according to the present invention, even when the user of the mobile terminal 2 is separated from the ticket gate or the entrance/exit gate, the information can be seen on the held mobile terminal 2.

Incidentally, in the present embodiment, the example of the case where the IC module accessed by the communication device 1 is mounted on the mobile terminal 2 has been described, but the present invention can also be applied to a case where the IC module is mounted on an IC card. In this case, it is preferable that the IC module mounted on the IC card and the IC module mounted on the mobile terminal are configured to perform the above-described near field communication in a non-contact manner. However, the present invention can be applied to a case where the IC module is not mounted on the mobile terminal, that is, a case where the IC module mounted on the IC card and the mobile terminal do not communicate with each other. For example, there is a case where the mobile terminal is mounted on a case with a card holder for mobile terminal (for example, the mobile terminal is inserted into the case), and the IC card is mounted on the card holder (for example, the IC card is inserted into the holder). In this case, the communication device 1 accessing the IC module of the IC card mounted on the holder outputs the sound effect in response to the completion of the access. As described above, the mobile terminal mounted on the case displays the provision information on the location where the communication device 1 exists (for example, location specified by the location information detected by the GPS reception unit 26), in response to the input of the sound effect indicating the preset sound pattern.

REFERENCE SIGN LIST 1 communication device
2 mobile terminal
2a IC module unit
21 microphone
22 display unit
23 operation unit
24 storage unit
25 mobile wireless communication unit
26 GPS reception unit
27 control unit

The invention claimed is:

1. An information processing method, performed by a mobile device, wherein the mobile device includes a display device and a microphone, the information processing method comprising:
sensing an access of an IC module by monitoring a state of the IC module, wherein the IC module is provided in the mobile device and the IC module communicates with an access device by an electromagnetic wave, wherein the access device communicates with the IC module by the electromagnetic wave;
switching the microphone from off to on when the access is sensed;
receiving a sound effect via the microphone from the access device in response to completion of a payment transaction between an the IC module and the access device, wherein the receiving the sound effect begins after completion of the payment transaction; and
displaying provision information on a location where the access device exists, on the display device which is display-controlled, in response to the sound effect indicating a preset sound pattern.

2. The information processing method according to claim 1, further comprising:
displaying the provision information, including service information on a plurality of services available to a user within a predetermined range from the location, on the display device.

3. The information processing method according to claim 2, wherein
the service information includes at least one of a scheduled time of the service, a changed scheduled time of the scheduled time, and a waiting time until the use of the service.

4. The information processing method according to claim 2, further comprising:
displaying the provision information, including a list of service information on each of the plurality of services, on the display device.

5. The information processing method according to claim 3, further comprising:
specifying service information on services matched with the use of the user, based on a time when the sound is input, a necessary geographic travel time from the location where the access device exists to a use location where the service is provided, and the scheduled time of the service or the changed scheduled time, wherein the specified service information is displayed on the display device.

6. The information processing method according to claim 2, further comprising:
specifying service information on a high-order predetermined number of the services that is capable of early arriving at a desired location of the user, the service being a service of transportation facility that transports the user, wherein
the specified service information is displayed on the display device.

7. The information processing method according to claim 2, further comprising:
specifying service information on a high-order predetermined number of services whose moving distance from the location to a use location of the service is short, wherein
the specified service information is displayed on the display device.

8. The information processing method according to claim 7, wherein
the service is regarding transportation facility that transports the user, and
the use location includes a location where the user gets on the service and a location where it is the easiest to get off or transfer at a use end location of the service.

9. A mobile device configured to:
sense an access of an IC module by monitoring a state of the IC module, wherein the IC module is provided in the mobile device and the IC module communicates with an access device by an electromagnetic wave, wherein the access device communicates with the IC module by the electromagnetic wave;
switch the microphone from off to on when the access is sensed;
receive, after completion of the payment transaction, a sound effect via the microphone from the access device in response to completion of a payment transaction between an the IC module and the access device; and
display provision information on a location where the access device exists, on the display device which is display-controlled, in response to the sound effect indicating a preset sound pattern.

10. A non-transitory recording medium on which an information processing program is computer-readably recorded, the information processing program causing a computer of a mobile device, to perform:
sensing an access of an IC module by monitoring a state of the IC module, wherein the IC module is provided in the mobile device and the IC module communicates with an access device by an electromagnetic wave, wherein the access device communicates with the IC module by the electromagnetic wave;
switching the microphone from off to on when the access is sensed;
receiving, after completion of the payment transaction, a sound effect via the microphone from the access device in response to completion of a payment transaction between an the IC module and the access device, and
displaying provision information on a location where the access device exists, on the display device which is display-controlled, in response to the sound effect indicating a preset sound pattern.

* * * * *

UNITED STATES PATENT AND TRADEMARK OFFICE
CERTIFICATE OF CORRECTION

| | |
|---|---|
| PATENT NO. | : 10,789,664 B2 |
| APPLICATION NO. | : 14/427917 |
| DATED | : September 29, 2020 |
| INVENTOR(S) | : Yutaka Jinno and Hideki Akashika |

It is certified that error appears in the above-identified patent and that said Letters Patent is hereby corrected as shown below:

On the Title Page (73) Assignee; Delete "Rakuten, Inc,. Shinagawa-ku, Tokyo (JP)" and insert -- Rakuten, Inc., Setagaya-ku, Tokyo (JP) --

Signed and Sealed this
Ninth Day of February, 2021

Drew Hirshfeld
*Performing the Functions and Duties of the
Under Secretary of Commerce for Intellectual Property and
Director of the United States Patent and Trademark Office*